May 22, 1928.
E. S. CAMPBELL
AIRPLANE LANDING HOOK
Filed Sept. 12, 1927
1,670,402
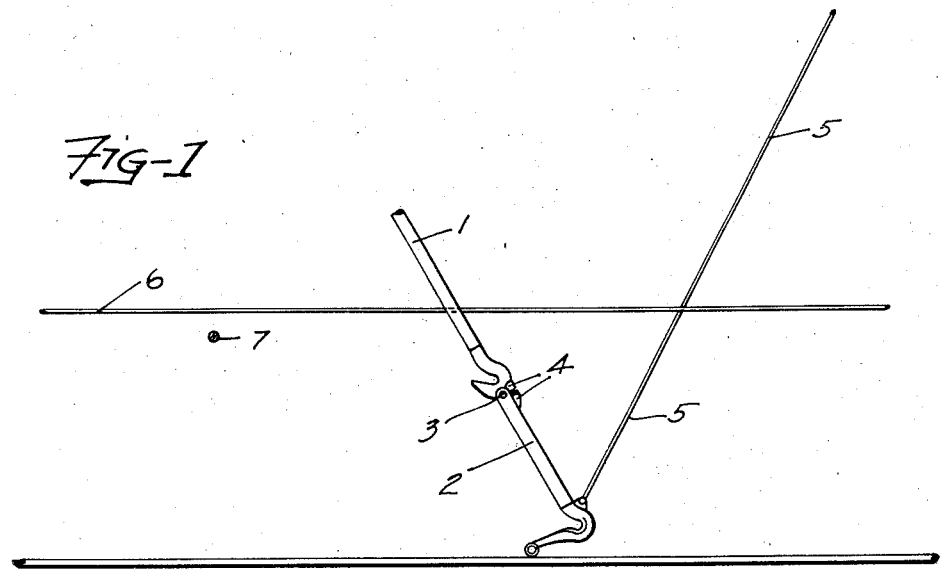
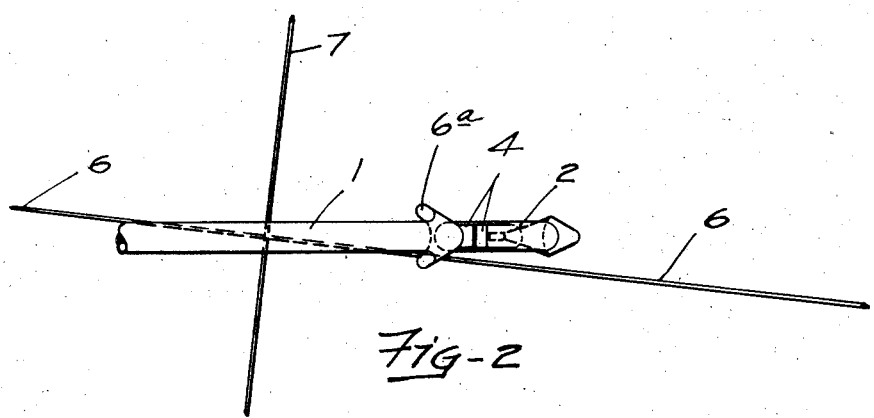
INVENTOR
Edward Strong Campbell
BY
James Douglas Girnan
ATTORNEY Patented May 22, 1928.

1,670,402

UNITED STATES PATENT OFFICE.

EDWARD STRONG CAMPBELL, OF SEATTLE, WASHINGTON, ASSIGNOR TO BOEING AIRPLANE COMPANY, OF SEATTLE, WASHINGTON.

AIRPLANE-LANDING HOOK.

Application filed September 12, 1927. Serial No. 218,996.

This invention relates to improvements in trailing hooks for airplanes and more especially to the type of hook designated for engagement with an arresting gear installation, as used for airplane landings in limited areas, employing a special arrangement of stretched wires. In such an installation, longitudinal wires, (i. e., wires parallel to the airplane's course) as well as transverse wires may be employed, in which case a slight component (or skidding) in the airplane motion while landing (a condition very difficult if not impossible to eliminate entirely) is liable to cause the trailing hook to foul and ride (or slide along) a longitudinal wire. This tends to hold down the tail of the airplane without properly arresting its motion, resulting in increased lift from the wings (due to increased angle of attack and to the fact that a speed somewhat greater than the stalling speed is customarily maintained until actual engagement with the gear). The plane will therefore attempt to rise, the trailing hook still being engaged with and sliding along the longitudinal wire. Under such conditions it is improbable if not impossible for a trailing hook of the type customarily employed to engage a transverse wire as intended, in which case the motion of the airplane will not be properly arrested, the landing will be unsuccessful, and a crash of more or less serious consequences will ensue. With my improved form of hook, however, proper engagement with a transverse wire is insured, even though the conditions conducive to the riding of a longitudinal wire are present. This is accomplished by the use of two hooks in tandem, the first being designed in a manner to insure its riding a longitudinal wire if the airplane is skidding and the last being so arranged that it will hang in proper position for engagement with a transverse wire, regardless of whether the combination is riding a longitudinal wire or acting in the normal manner. In the latter case, either hook may engage a transverse wire and arrest the airplane's motion in the usual way.

These and other objects will appear as my invention is more fully hereinafter described in the following specification, illustrated in the accompanying drawings and finally pointed out in the appended claims.

In the drawings:

Fig. 1 is a fragmentary side elevation of my improved form of hook in sliding engagement with a landing platform showing a fragment of wires of the arresting gear which consists of a system of longitudinal and transverse wires.

Fig. 2 is a plan view of Fig. 1.

Referring now more particularly to the drawings:

Reference numeral 1 indicates the main member of a hook combination. 2 indicates a second hook member which is pivotally suspended from the hook 1, as indicated at 3. Suitable abutment stops 4 being provided on the hooks 1 and 2 to prevent the second hook from swinging upwardly with respect to the hook 1 beyond the position shown. 5 indicates a controlling cable extending from the hook 2 up through the fuselage of the airplane to a point within convenient reach of the operator, for raising and lowering the combination. 6 indicates one of the longitudinal wires, and 7 one of the transverse wires of an arresting gear installation.

Since it sometimes happens that a plane making a landing approaches the arresting gear somewhat on an angle with respect to the longitudinal wires (i. e., skidding) as shown in Fig. 2, the hook member 1 is flared outwardly as at 6ª purposely to engage and ride a longitudinal wire, during which time the lowermost, or second hook 2 will hang in such a position as to insure its engaging a cross wire.

While I have shown a particular form of embodiment of my invention, I am aware that many minor changes therein will readily suggest themselves to others skilled in the art without departing from the spirit and scope of my invention.

Having thus described my invention; what I claim as new and desire to protect by Letters Patent is:—

1. In a device of the class described, the combination of a hook member, a second hook swingably suspended from the first mentioned hook, means formed on said first mentioned hook for engaging arresting gear at any angle.

2. In a device of the class described, a main hook member depending from an airplane, a supplemental hook swingably suspended from the said main hook member, means formed on the main hook member for sliding engagement with longitudinal wires of an arresting gear; to permit the said supplemental hook to position itself by gravity for engagement with oppositely disposed wires of the arresting gear.

In testimony whereof I affix my signature.

EDWARD STRONG CAMPBELL.